C. H. PRICE.
CORNER FITTING FOR BEDSTEADS, COTS, AND MATTRESSES.
APPLICATION FILED JAN. 14, 1922.
1,433,097.
Patented Oct. 24, 1922.
5 SHEETS—SHEET 1.
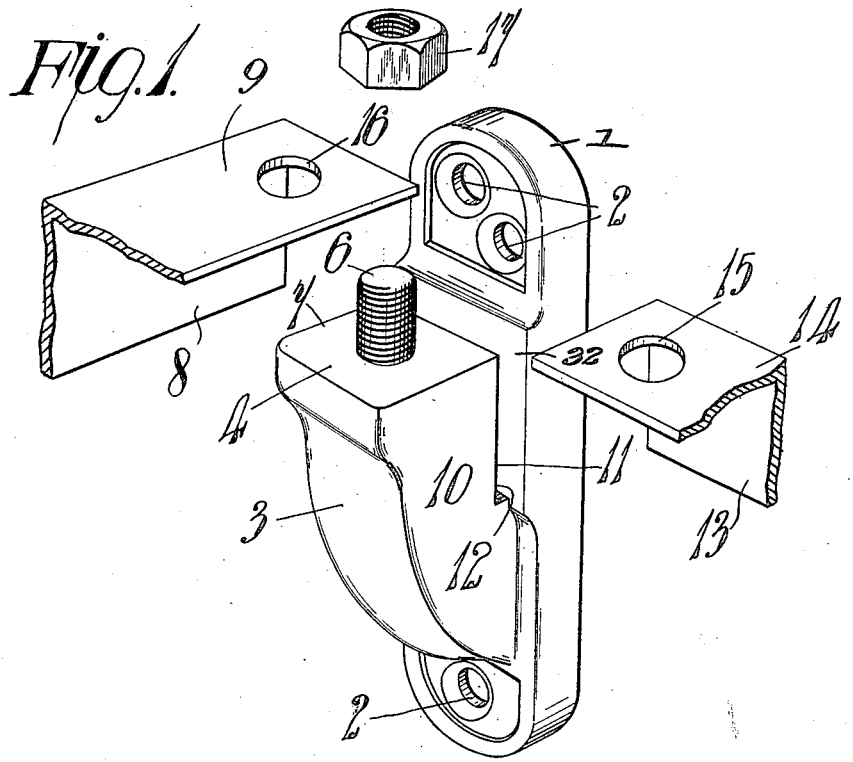
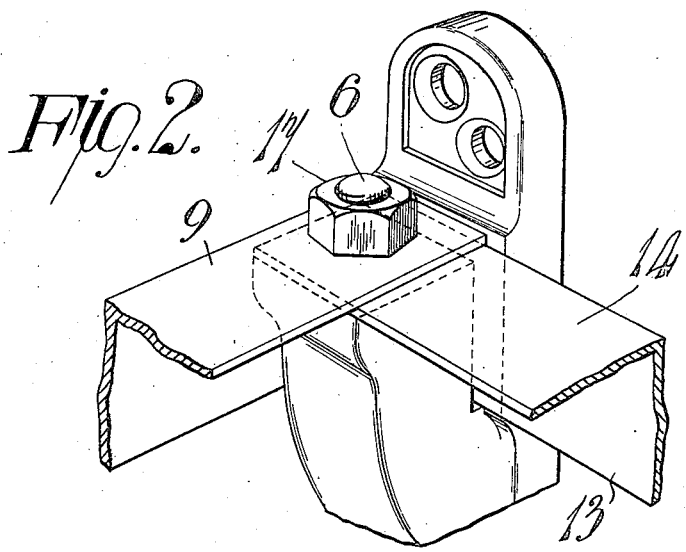

C. H. PRICE.
CORNER FITTING FOR BEDSTEADS, COTS, AND MATTRESSES.
APPLICATION FILED JAN. 14, 1922.

1,433,097.

Patented Oct. 24, 1922.
5 SHEETS—SHEET 2.

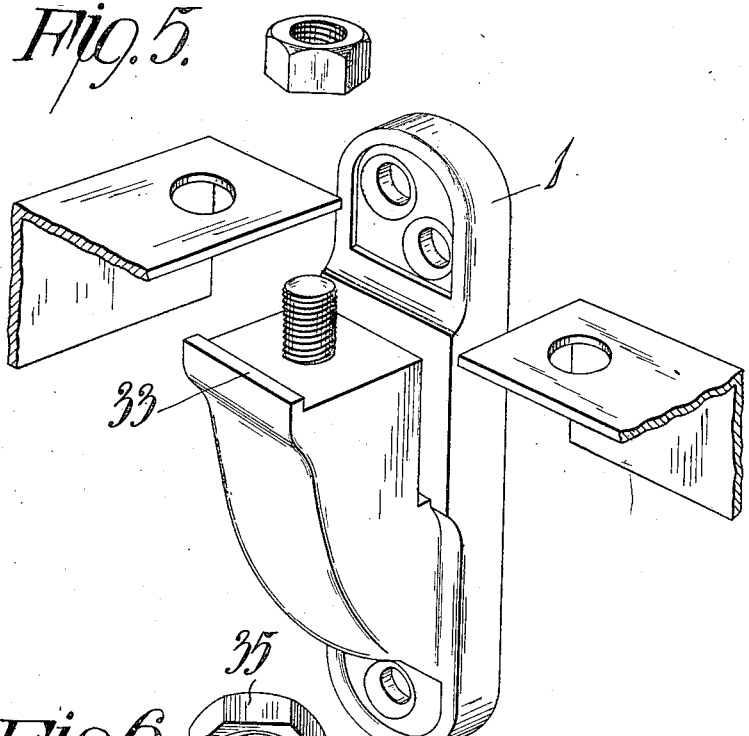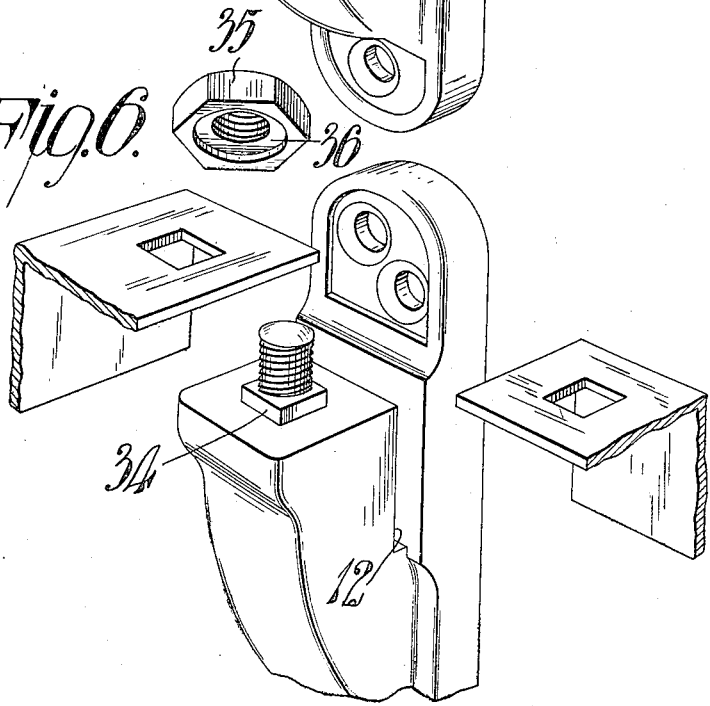

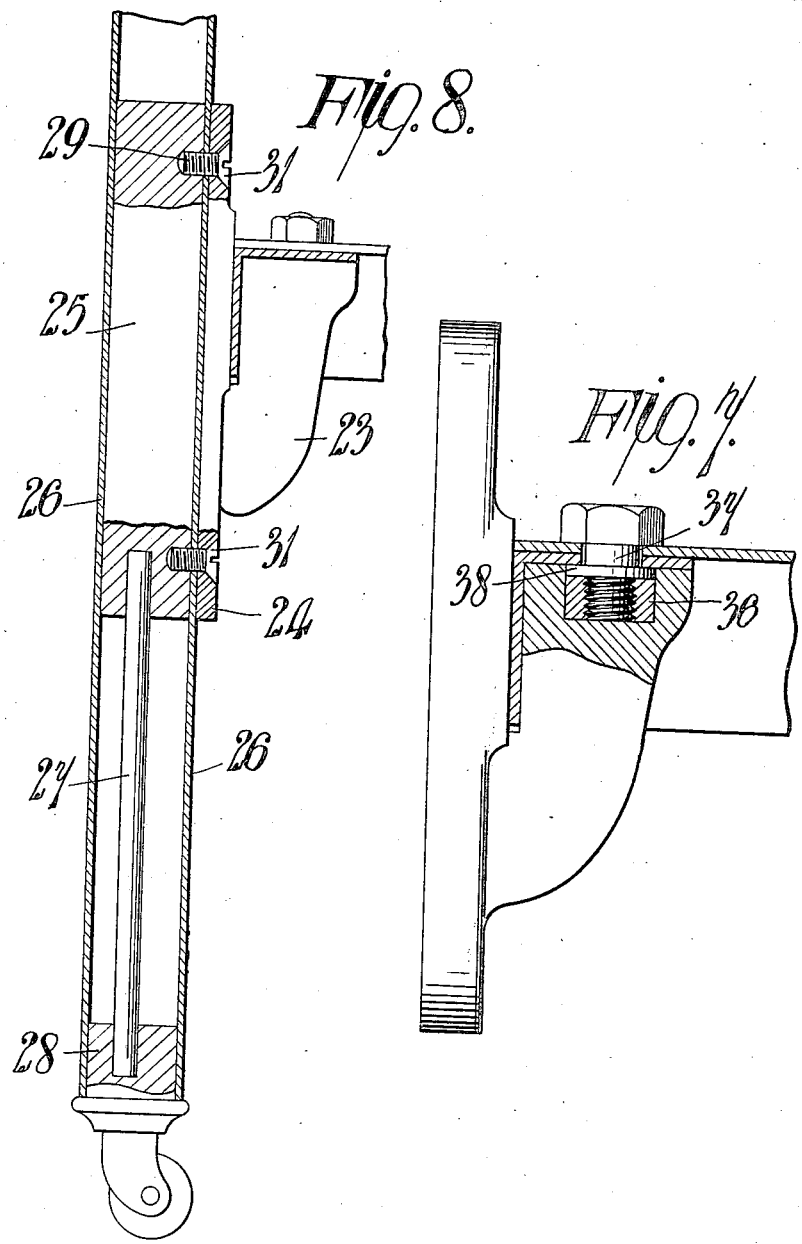

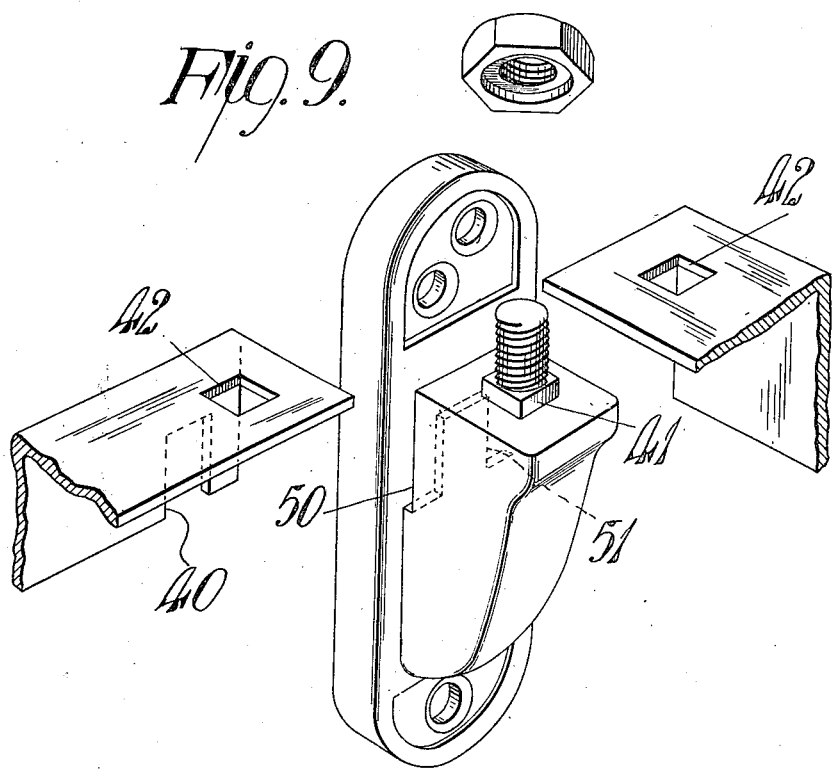

Patented Oct. 24, 1922.

1,433,097

UNITED STATES PATENT OFFICE.

CHARLES HENRY PRICE, OF SEDGLEY, ENGLAND.

CORNER FITTING FOR BEDSTEADS, COTS, AND MATTRESSES.

Application filed January 14, 1922. Serial No. 529,309.

*To all whom it may concern:*

Be it known that I, CHARLES HENRY PRICE, a subject of the King of Great Britain, residing at Elmhurst, Sedgley, in the county of Stafford, England, have invented certain new and useful Improvements in Corner Fittings of Bedsteads, Cots, and Mattresses (for which I have filed applications for patents in Great Britain, No. 27,299, filed September 25, 1920, Cognate No. 30,773, filed November 1, 1920), and I do hereby declare the following to be a full, clear, and exact description of the same.

This invention has reference to corner fittings of bedsteads, cots and mattresses including such bedsteads as are used on ships and are known as ships' berths. These corner fittings are fixed to or adapted to be fixed to or formed with the corner pillars, or to the ends of the bedsteads or cots or sides of the ships' berths and are adapted to fix together the said pillars or bedstead or cot ends or ships' berth sides and the side and end angle bars of the bed bottom or mattress frame.

More particularly my invention relates to that type of fitting which includes a member upon the corner fitting or adapted to be secured to the corner fitting having a projecting lug, from the upper surface of which projects a fixed screw or stud, upon which are placed and secured the end or side members, or both, of the bedstead.

One of the objects of the present invention is to provide an improved construction whereby both the end and side members of the bedstead are held firmly to the lug and with absolute rigidity, so that neither of said members is able to make any movement relative to the other or to the lug.

The main feature of the present invention consists in providing in a lug having one vertical side face to accommodate the vertical flange of a side or end member of the bedstead, a slot or opening in the side of the lug extending at right angles to said vertical face, the slot extending inwardly from the side of the lug for a substantial distance sufficient to provide a good anchorage for the vertical flange of an angle iron, i. e., extending across or partially across the lug, say at least from the edge of the lug up to about its centre.

Another important feature of my invention consists in forming the slot with its sides flat and spaced apart by a distance equal to the thickness of an angle iron.

This slot which is formed in the lug may be an open topped slot, the base of the slot being formed by the metal which connects the attachment plate to the lug.

In addition to providing the slot I may provide upon the top of the lug an upwardly projecting square or other flat-sided portion and provide in the angle irons similarly shaped holes for engaging with said portion, the engagement between such portion and the angle irons fixing the angle iron firmly in relation to the corner fitting.

With such a construction I may prefer to employ a recessed nut for screwing on to the upwardly projecting stud, the recess being sufficiently large to clear the square or other flat-sided portion, so that if only a single angle iron is engaged with the square or its equivalent, the recess in the nut will compensate for the loss of thickness due to the absence of the second angle iron.

The angle iron may have its vertical flange notched out so that it can straddle over the metal between two slots, one on each side of the lug.

It will be understood that instead of providing an upwardly projecting stud or its equivalent which is fixed in the lug either a loose stud or bolt may be used, or a tapped socket may be provided in the lug, in which case one of the angle irons will be provided with a set screw. To prevent accidental loss or removal, this set screw may have a collar secured upon it upon the opposite side of the angle iron flange than that from where the head of the set screw is disposed. In such a construction the set screw may either pass through the single angle iron, or through both angle irons, and above the socket in the lug is a recess to accommodate the collar.

The outer edge of the upper surface of the lug may be provided with an upwardly projecting ridge or lip, the height of which is not greater than the thickness of a bedstead angle iron.

Referring to the drawings:—

Figure 1 is a perspective view showing one construction of fitting in accordance with my invention suitable for a bedstead or cot with wooden ends, the parts being shown separately.

Figure 2 is a perspective view of the fitting shown in Figure 1 with the parts assembled.

Figure 5 is a perspective view showing a modification of the construction shewn in Figure 1.

Figure 6 is a perspective view showing the separate portions of a construction wherein a square projection is provided upon the top of the lug.

Figure 7 is a sectional view showing a construction wherein a set screw and socket are provided in the place of a stud.

Figure 8 is a view partly in section showing a further modification as applied to a tubular bedstead or cot.

Figure 9 is a perspective view showing the separate portions of a modified construction.

Figure 3:
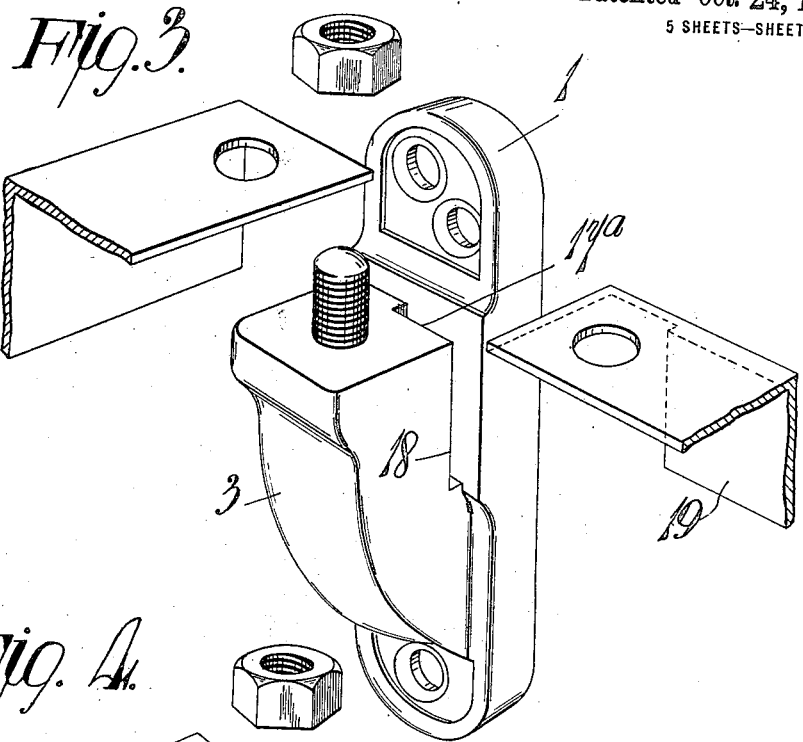
Figure 3 is a perspective view showing a modification of the fitting shown in Figures 1 and 2.

In the construction shown in Figures 1 and 2, the fitting comprises an attachment plate 1 provided with suitable holes 2 whereby it may be attached by screws to a corner pillar or its equivalent of a bedstead.

Made integrally with the plate 1 is a lug 3, the upper surface 4 of which is mainly flat, but may be provided with an upwardly projecting ridge or lip at its outer edge. This projecting ridge or lip may, however, be omitted, and is not illustrated in the drawings.

Secured in the upper part of the lug 3 is a vertically projecting stud 6. This stud may be secured in position in any suitable manner, such for instance as by casting it in the lug 3. The stud may be screwed as shown, or it may be provided with a slot through which may be passed a cotter or pin for securing the end and side members of the bedstead in position.

At least one side 7 of the lug 3 is made with a vertical face forming an abutment for the vertical face 8 of the bedstead angle iron 9. For the purpose of making the fittings reversible, it is preferred to make that side of the lug 3 which is opposite to the side 7 and which is designated 10 also vertical.

A second vertical face upon the lug is provided as shown at 11. As shown in Figures 1 and 2 this face 11 is formed by making a horizontal groove 12 through the lug or between the lug and the attachment portion 1. The opposite side of the groove 12 is formed as a facing 32 made integral with the attachment portion 1. This groove or slot is of such a width and depth as to accommodate the vertical flange 13 of the bedstead angle iron 14.

The parts are assembled as shewn in Figure 2, the angle iron 14 first being placed in position with its flange 13 in the slot 12 and its hole 15 engaging over the stud 6. When in this position the horizontal flange of the angle iron 14 presents a flat surface for accommodating the other angle iron 9. The angle iron 9 is then placed in position with its hole 16 over the stud 6 and the two angle irons are secured in position by the nut 17, or by equivalent means, such as a cotter or pin.

When secured as shown in Figure 2, the two angle irons are incapable of any movement or slackness with respect to each other or with respect to the corner fitting, as both irons have their vertical flanges secured against a vertical face or abutment on the corner fitting. Further, it will be observed that by this construction the angle bars have no fittings or parts fixed to their ends, so that they can be packed one within the other when they have been removed from the corner fittings.

Referring to Figure 3, in this construction the slot which provides the second vertical face on the lug does not extend completely across the lug but only sufficiently far as will provide a good anchorage for the angle iron, say, up to the centre. In this case the slot is designated 17$^a$ and the second vertical face on the lug is designated 18.

In such a construction as shown in Figure 3, the vertical flange 19 of one of the angle irons must be cut away at its end as shown in the drawing. The constructions shown in Figures 1 2 and 3 are primarily intended for wooden bedsteads but the invention is equally applicable to metal bedsteads by using either of the methods shown in Figures 4 or 8, or by any other suitable method, for securing the lug to a metal corner pillar.

Figure 4:
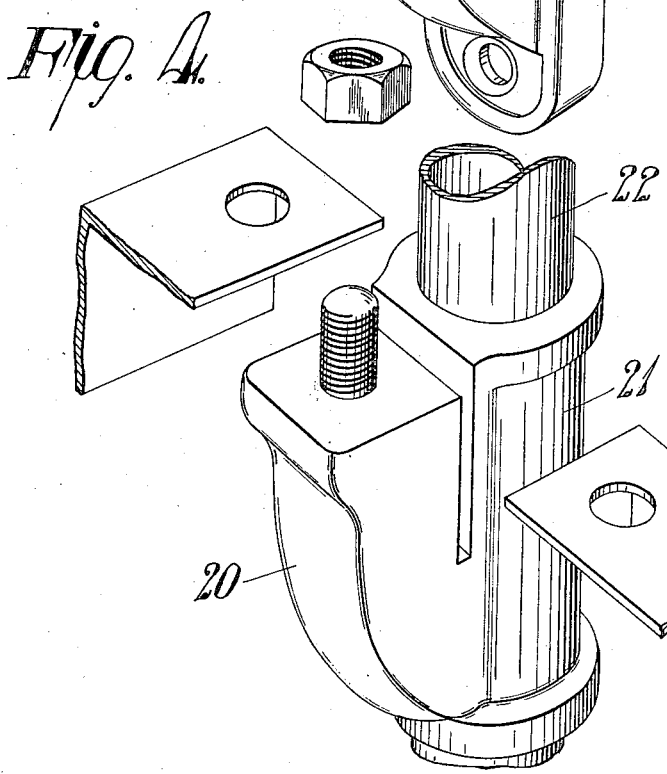
Figure 4 is a perspective view showing a further modification as applied to iron bedsteads or cots.

In Figure 4, the lug 20 is shown with an attachment portion 21 in the form of a sleeve which is secured to or cast on the metal corner pillar 22 of a bedstead. In this construction the formation of the lug is similar to that shown in Figures 1 and 2, but the lug as described with reference to Figure 3 might equally well be employed.

The construction shown in Figure 5 is similar to that shown in Figures 1 2 and 3 except that the lug is provided with an upwardly projecting lip 33, the height of which is about equal to the thickness of one of the angle irons, so that when the first angle iron is placed in position it forms, together with the lip, a flat surface for accommodating the second angle iron.

The construction shown in Figure 6 is similar to that described with reference to Figures 1 2 and 3 except that the upwardly projecting stud on the lug is provided with a square 34 and each of the angle irons is provided with a square hole for engagement therewith. The provision of this square gives additional rigidity and security to the angle irons. In this construction the nut 35 is provided with a recess 36 upon its underside, which allows it to clear the square 34 so that if only one angle iron is to be engaged with the lug, the recess in the nut compensates for the loss of thickness due to the absence of the other angle iron.

Figure 7 is a view in section showing a construction similar to those already described, but in place of the stud on the lug, the lug is provided with a tapped socket 36, which is cast in the lug or secured therein in other suitable manner. When this socket is used, the angle irons, or one of them, is provided with a set screw 37 having a collar 38 secured beneath the flange of the angle iron so as to prevent its removal. It will be understood that the set screw 37 can be rotated for securing the angle irons in position, but it cannot be removed completely, and so will not be liable to be lost.

In the construction shown in Figure 8, the invention is shown applied to a metal bedstead wherein the vertical pillars are made of comparatively thin brass or other tube. In this case the lug 23 may be made substantially as described in the other constructions, but instead of being provided with an attachment portion, such as 1, it may have an attachment portion 24 which is curved so that it can seat itself against a round tube.

In the construction shown in Figure 8, a cast metal or other block 25 is provided within the tubular pillar 26. This block 25 has secured to its lower part a rod or tube 27, the lower end of which is secured into a block 28 forming part of a caster fitting. The parts 25, 27 and 28 are all secured together and may be cast on to one another.

The block 25 is provided with two tapped holes for the reception of screws for the lug. These threaded holes 29 may be provided by casting nuts in the block 25. Thus, when it is desired to secure the lug in position on the pillar 26, holes are made in the pillar 26 opposite to the holes 29, and screws 31, or their equivalents, are employed for securing the lug in position.

In the construction shown in Figure 9, one of the angle irons is notched out as shown at 40, so that it can straddle over a web which is left in the slot in the lug. In this construction the lug is provided with a slot 50 which at the sides of the lug is of a depth equal to the depth of the flange of an angle iron. In the middle of the lug the slot is not so deep, a web of metal 51 being left between the lug and the attachment portion, over which web the notch 40 straddles.

In this construction a square is shown upon the top of the lug similar to that described with reference to Figure 6, and the angle irons are provided with square holes and a recessed nut is provided. This construction could, however be used without the square 41 and without the square holes 42, in which case a recessed nut would not be necessary.

What I claim then is:—

1. A corner fitting for bedsteads comprising an attachment member, a lug projecting therefrom, a securing member upon the lug, one side of the lug being vertical and forming an abutment for the vertical flange of an angle member of the bedstead, and a slot intervening between the lug and the attachment member, said slot being deeper at the sides than in the middle.

2. A corner fitting for bedsteads comprising an attachment member, a lug projecting therefrom, a stud projecting from the upper surface of the lug, one side of the lug being vertical and forming an abutment for the vertical flange of an angle member of the bedstead, and a slot intervening between the lug and the attachment member, said slot opening from the side of the fitting and extending into it at right angles to said vertical side for a substantial distance to form a secure anchorage for the vertical flange of the second angle member of the bedstead, said slot being deeper at the sides than in the middle.

3. In a bedstead in combination a corner fitting comprising an attachment member, a lug projecting therefrom, a stud projecting from the upper surface of the lug, an angle iron forming one member of a bedstead frame, one side of said lug being vertical and forming an abutment for said angle iron, a slot intervening between the lug and the attachment member, said slot being deeper at the sides than in the middle, a second angle iron having a notch and having its vertical flange engaging in said slot, and a nut screwing to said stud and securing the two angle irons to the fitting.

4. A corner fitting for bedsteads comprising an attachment member; a lug projecting therefrom; a fixed screw projecting from the upper surface of the lug; a slot intervening between the lug and the attachment member; a transverse angle member the vertical flange of which enters into the said slot whilst the horizontal flange is provided with a hole for engagement with the said screw; a longitudinal angle member the interior surface of the vertical flange of which abuts against the outside of the lug whilst the horizontal flange is provided with a hole for engagement with the aforementioned screw; and a nut carried by the vertical screw and serving to clamp the two angle members to the lug; all so arranged that when in position the angle members and lug are in rigid and rectangular relation with each other.

5. In a bedstead, the combination of a corner fitting; a vertical screw in said fitting; a transverse slot in said fitting; a transverse angle member of L section the vertical flange of which enters into said slot, the horizontal flange resting on the top of said fitting, this angle member having a hole into which said vertical screw enters; a longitudinal angle member of L section the vertical flange of which fits against the outer wall of the said fitting, the horizontal flange of which rests on the top of the horizontal flange of the transverse angle member, this longitudinal angle member also having a hole into which the said vertical screw enters; a nut on said screw clamping the two angle members rigidly to the fitting; and lugs on said fitting having screw holes for securing the fitting to the bedstead pillars; all so arranged that when in position the angle members and fitting are in rigid and rectangular relation with each other.

6. In a bedstead, the combination of a bedstead pillar; a corner fitting made from cast metal; a vertical screw cast in said fitting; a transverse slot in said fitting; a transverse angle member of L section, the vertical flange of which enters into said slot, the horizontal flange resting on the top of said fitting, this angle member having a hole into which said vertical screw enters; a longitudinal angle member of L section the vertical flange of which fits against the outer wall of the cast fitting, the horizontal flange of which rests on the top of the horizontal flange of the transverse angle member, this longitudinal angle member also having a hole into which said vertical screw enters; a nut on said screw clamping the two angle members rigidly to the fitting; and lugs on said fitting having screw holes for securing the fitting to the bedstead pillars; all so arranged that when in position the angle members, fitting and bedstead pillars are in rigid and rectangular relation with each other; substantially as set forth.

In witness whereof I affix my signature.

CHARLES HENRY PRICE.